United States Patent

[11] 3,584,824

| [72] | Inventor | Roy C. Belcer |
| | | Opp, Ala. |
| [21] | Appl. No. | 749,786 |
| [22] | Filed | Aug. 2, 1968 |
| [45] | Patented | June 15, 1971 |
| [73] | Assignee | Dorsey Trailers, Incorporated |
| | | Elba, Ala. |

[54] ADJUSTABLE TWIST LOCK
12 Claims, 6 Drawing Figs.

[52] U.S. Cl. .................................................. 248/361,
105/366, 248/119
[51] Int. Cl. ...................................................... B65d 45/00
[50] Field of Search ............................................ 248/361,
119 S; 105/366, 366.2, 366.4, 366.6

[56] References Cited
UNITED STATES PATENTS

| 3,486,787 | 12/1969 | Campbell .................... | 248/361X |
| 3,159,111 | 12/1944 | Gutridge ..................... | 105/366 |
| 3,367,615 | 2/1968 | Turpen ........................ | 248/361 |
| 3,438,671 | 4/1969 | Seng ........................... | 248/361X |

*Primary Examiner*—Chancellor E. Harris
*Attorney*—Joseph Weingarten

ABSTRACT: An adjustable twist lock for coupling a cargo container to a platform. The twist lock is adapted to secure containers having corner fittings constructed in accordance with differing standards.

PATENTED JUN 15 1971

INVENTOR
ROY C. BELCER
BY
ATTORNEYS

PATENTED JUN 15 1971 3,584,824

INVENTOR
ROY C. BELCER
BY
ATTORNEYS

ADJUSTABLE TWIST LOCK

FIELD OF THE INVENTION

This invention relates in general to coupling devices and more particularly concerns a novel adjustable twist lock for securing cargo containers to transportation vehicle platforms such as truck bodies, semitrailers, railroad cars and ship decks or platforms.

DISCUSSION OF THE PRIOR ART

The shipment of cargo in containers, a concept commonly referred to in the transportation industry as "containerization," has become a major portion of both domestic and international shipping. Container shipping involves the use of a standardized cargo module which may be detachably connected to various transportation vehicles. Such containers are most commonly seen mounted on chassis for rail and over-the-road transportation from which they may be detached for ocean or other types of transportation. These containers are generally formed of relatively lightweight metal panels mounted on frames having corner fittings adapted to facilitate stacking in the cargo holds of ships and attachment by a standard clamping arrangement to chassis for land transportation or to other types of transportation platforms.

In the course of the development of containerization a viable working concept, corner fittings for the containers have evolved with different characteristics which have been adopted by the various organizations concerned with the setting of standards. Thus, the American Standards Association (ASA) has declared that a corner fitting of certain specified dimensions should be used on cargo containers. Accordingly, locking devices were developed to couple with these fittings to secure containers to transportation vehicles. Another set of standards for container corner fittings was promulgated by the International Standards Organization (ISO) which agreed with those adopted by the United States of America Standards Institute. Corner fittings constructed in accordance with this second set of standards require the use of securing devices of somewhat different configuration than those used with the ASA corner fitting. By the time these standards were agreed upon, many containers of both types were in widespread use. The situation has thus developed that chassis constructed for use with cargo containers may not be useful for some, or all, of the containers arriving at a dock by ocean transportation at a particular time. The result is inefficient shuffling about, attempting to match chassis with containers, with some chassis remaining idle while some containers await delivery.

SUMMARY OF THE INVENTION

It is the primary object of this invention to provide a simple twist lock-securing means for a chassis which is adaptable to accommodate corner fittings constructed in accordance with different standards. This novel twist lock is vertically adjustable by selectively positioning a spacer with respect to the longitudinally movable twist lock pin and the structural members of the platform in which the twist lock is mounted. The vertical adjustment afforded by this improvement allows the twist lock to conform to the requirements of both the ASA and ISO corner fittings to secure containers of either type to a platform equipped with this mechanism.

BRIEF DESCRIPTION OF THE DRAWING

The features and advantages of this novel adjustable twist lock will become apparent from the following detailed description when read in conjunction with the accompanying drawing, in which.

DESCRIPTION OF THE PREFERRED EMBODIMENT

Figure 1:
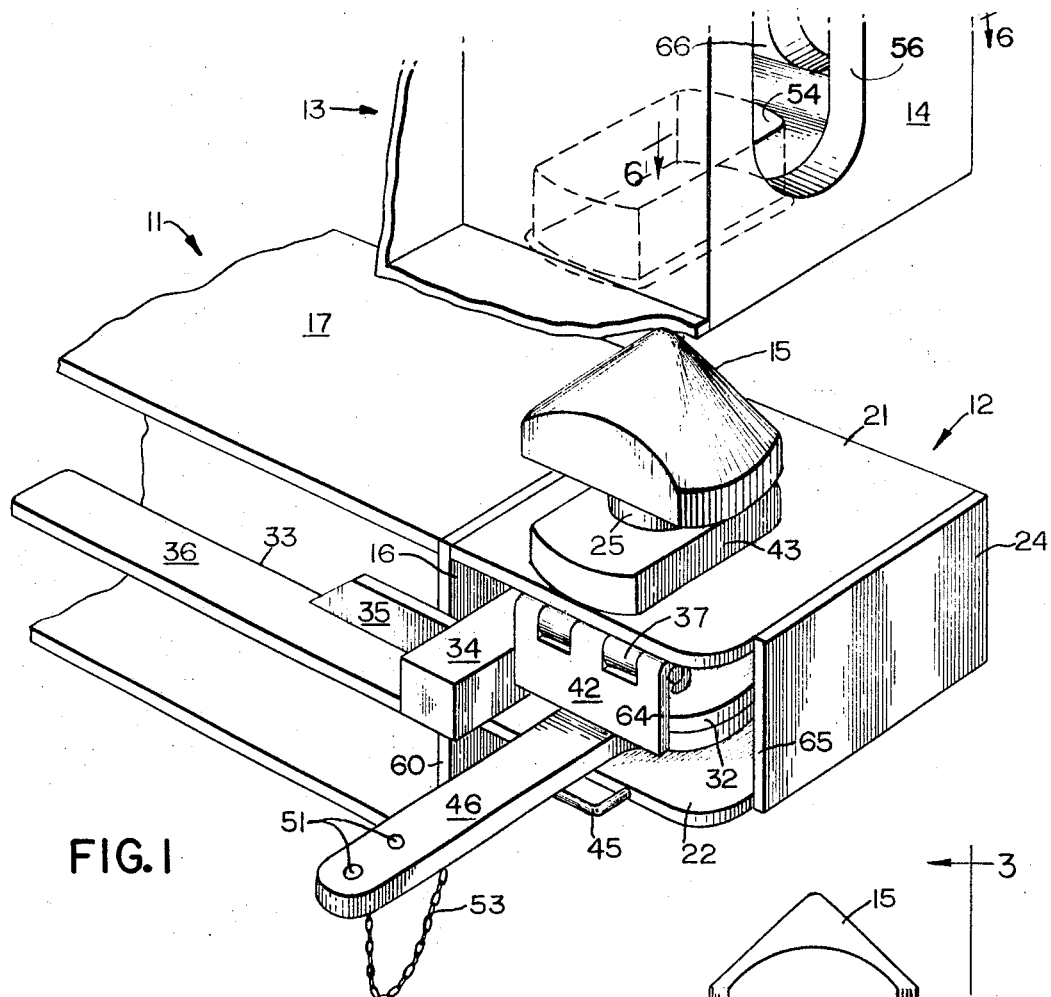
FIG. 1 is a perspective view of the corner of a chassis and the corresponding corner of a container showing a bolster having the adjustable twist lock constructed in accordance with the principles of this invention mounted therein.

With reference now to the drawing, and in particular to FIG. 1 thereof, there is shown a portion of a chassis 11 comprising I-beam cross member 17 having a bolster 12 secured to its end. A portion of the corner of a cargo container 13 having corner fitting 14 which is adapted to be secured to the chassis by means of the twist lock mechanism mounted in bolster 12, is shown detached from and slightly above chassis 11. For purposes of orientation, FIG. 1 is a rearward view showing the left rear, or roadside, corners of the chassis and container. The twist lock is shown in normal locked position and must be rotated 90° in order to mate with the proper hole in corner 14 as shown in FIG. 1. It is, of course, understood that each of the four lower corners of the container and the corresponding four corners of the chassis will have mating members such as those shown in FIG. 1 and it is therefore unnecessary to show or refer to each of them specifically in this description. It should also be understood that the particular relationships shown in the drawing between corner 14 and container 13, and bolster 12 and chassis 11 are examples only. The bolster may be added to the chassis as shown, or the twist lock may be incorporated within the chassis structure without the addition of anything which could be termed a bolster; the same being true for the container and its corner fitting. The invention herein described is concerned with the twist lock which may be mounted in any appropriate fashion on a suitable platform which is here described as a trailer chassis.

Figure 2:
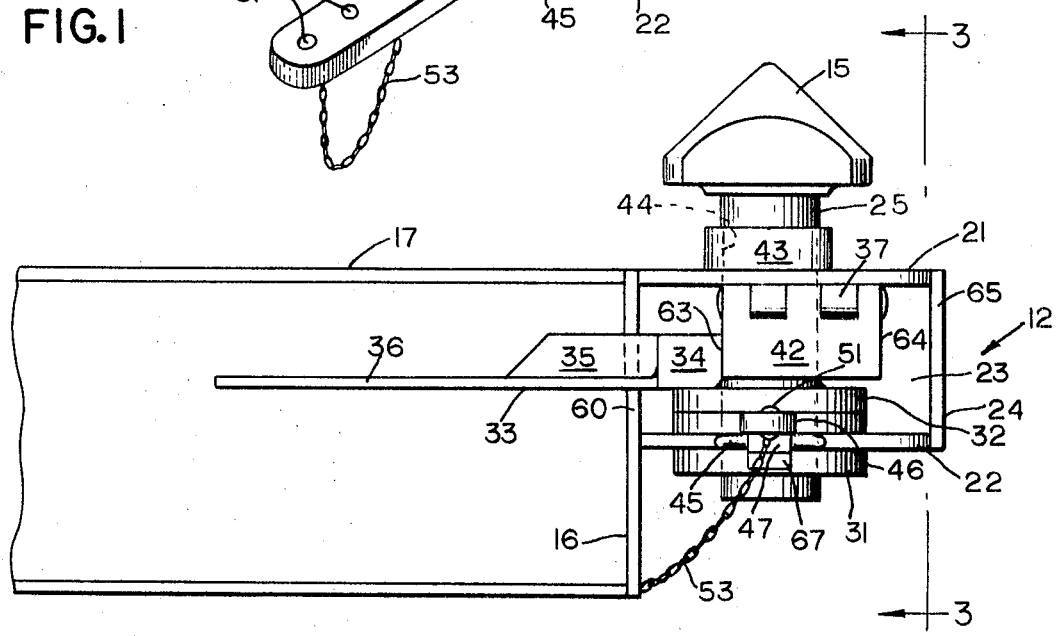
FIG. 2 is an elevational view of the adjustable twist lock of FIG. 1.
Figure 3:
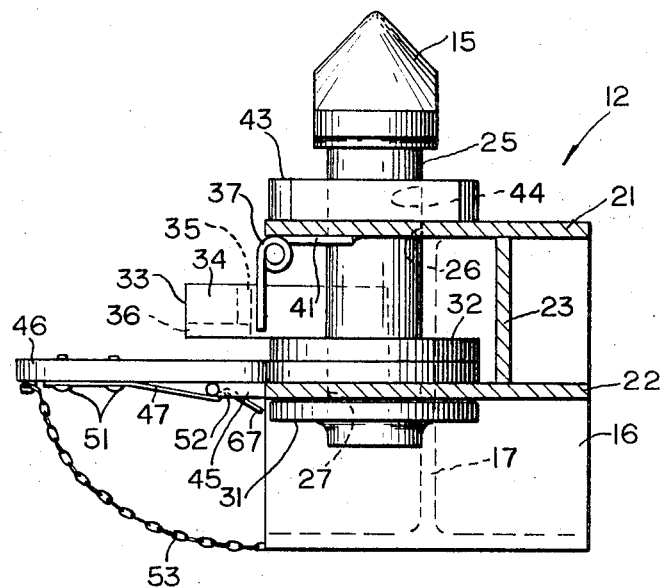
FIG. 3 is a cross-sectional view taken through cutting plane 3-3 of FIG. 2.
Figure 4:
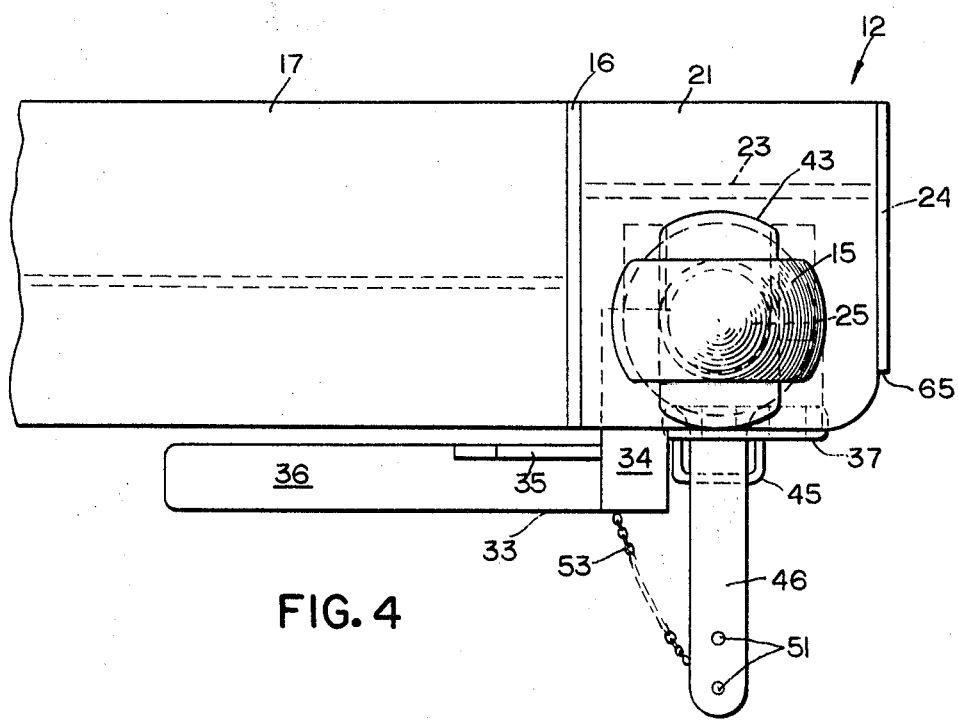
FIG. 4 is a top view of the bolster and twist lock shown in FIG. 1.

FIGS. 2, 3 and 4 show the corner bolster and adjustable twist lock of FIG. 1 in detail. Bolster 12 is comprised of cap plate 16 secured to the end of I-beam cross member 17, identical flanges 21 and 22, gusset 23 and end cap 24. These members are all appropriately secured to each other and to I-beam 17 in a suitable manner, such as by welding, to form the box-shaped bolster. The main functional element of this adjustable twist lock is the rotatable locking member which comprises twist lock head 15 and shank 25. The locking member is mounted in bolster 12 so as to permit it to rotate and move longitudinally. For this purpose shank 25 extends through aligned holes 26 and 27 in flanges 21 and 22 respectively. Washer 31 is attached to twist lock shank 25 near the bottom thereof and below flange 22. Washer 32 is spaced from washer 31 and is attached to the twist lock shank on the opposite side of flange 22, the space between washers 31 and 32 being substantially greater than the thickness of the flange. Washers 31 and 32 effectively restrict the longitudinal movement of the locking member.

Actuating handle 33, which comprises spacer block 34, gusset 35 and flat handle member 36, is secured to washer 32 adjacent twist lock shank 25. Hinge stop 37, comprised of mounting plate 41 which is secured to the underside of flange 21 and stop member 42 pivotably connected to the mounting plate, is shown in its normal position with stop member 42 perpendicular to mounting plate 41. As best shown in FIG. 3, twist lock guide 43 is formed with a hole 44 and is mounted on flange 21 with hole 44 in alignment with hole 26 in the flange. Twist lock shank 25 passes through hole 44 and twist lock head 15 rests atop guide 43 when in its alternate, or lower, position. As will be explained in greater detail below, twist lock guide 43 normally resides within the bottom hole in corner fitting 14 when container 13 is properly positioned to be secured to chassis 11.

As previously indicated, the twist lock is shown in its normal or upper position. The primary means for adjusting the twist lock between its normal and alternate positions is yoke spacer 46 shown in place between flange 22 and washer 32. The yoke spacer may be removed by pulling its handle longitudinally outward from the bolster, thereby allowing the twist lock to drop into its alternate position. In order to prevent longitudinal play of the twist lock from occuring when in its alternate position, yoke spacer 46 is reinserted around shank 25 between flange 22 and lower washer 31. Since yoke spacer 46 is removable, it is secured to the chassis by chain 53 in order to prevent it from dropping to the ground and possibly becoming lost.

To prevent the yoke spacer from vibrating loose in transit, it is provided with a flat spring clip 47 configured to mate with spring catch 45 on flange 22. Spring clip 47 is formed with notch 52 formed to snap over catch 45 when the yoke spacer is properly positioned with respect to shank 25. The spring clip is secured to the handle of the yoke spacer by suitable means such as rivets 51.

Figure 5:
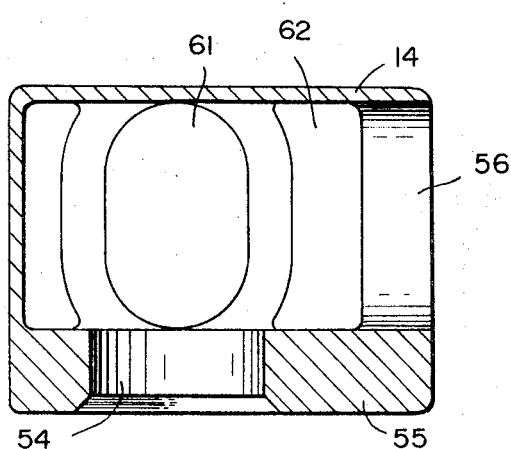
FIG. 5 is a cross-sectional view of the corner fitting taken along cutting plane 5-5 of FIG. 6.
Figure 6:
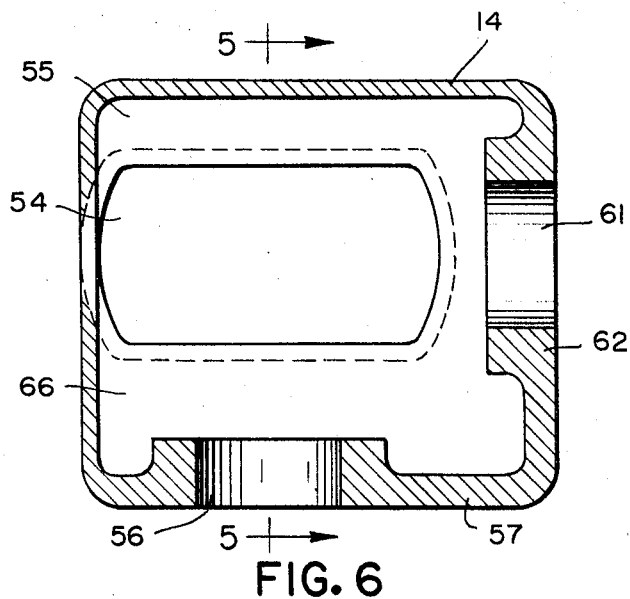
FIG. 6 is a cross-sectional view of the corner fitting taken through cutting plane 6-6 of FIG. 1.

An example of a corner fitting which couples with, and is secured by, the described twist lock is shown in perspective in FIG. 1 and in detail in FIGS. 5 and 6. The corner fitting is constructed with a central cavity 66 and has a hole 54 opening downwardly in bottom wall 55, a hole 56 opening outwardly in sidewall 57 and a hole 61 opening rearwardly in end wall 62. Hole 54 is shaped and configured to fit over twist lock head 15 and pin guide 43 when they are in alignment. Holes 56 and 61 have other purposes which are not relevant here and are shown only for completeness in this general description of a standard corner fitting.

The normal coupling operation of this novel twist lock is similar to other presently existing coupling devices. Twist lock head 15 is rotated 90° counterclockwise from the normal position shown by means of handle 33 so that it is aligned with guide 43 and hole 54 in corner fitting 14. The container is then lowered so that its base rests on chassis 11 and bottom wall 55 of the corner fitting rests on top of flange 21 of the bolster. Lateral motion is prevented by guide 43 which extends into hole 54. The bottom of twist lock head 15 is at substantially the same level as the inner surface of bottom wall 55. The twist lock is then rotated 90° clockwise to securely lock the corner fitting and the bolster together.

The essential difference between ASA and ISO standard corner fittings exists in the thickness of bottom wall 55. For purposes of description, it will be assumed that the corner fitting shown conforms to ISO standards and that the ASA fitting has a substantially thinner bottom wall. The problems generated by these different fittings may be readily appreciated, having reference to the twist lock of the general nonadjustable type previously mentioned. If, for example, the twist lock were nonadjustable and constructed to couple with the ISO fitting shown, a container with ASA fittings could not be tightly secured to a chassis. Since the base of the twist lock head must normally be spaced from the top surface of the bolster a distance equal to the thickness of the bottom wall of the corner fitting, a thinner bottom wall leaves vertical play between these two members equal in amount to the difference in bottom wall thickness. The consequent lack of firm connection between chassis and container would be dangerous and totally unacceptable for over-the-road transportation. Conversely, a twist lock constructed to couple with an ASA corner fitting could not even be rotated to lock an ISO fitting in place. The shorter distance between the head and the top of the bolster would prevent the twist lock head from passing completely through hole 54 and emerging into main cavity 66 in the corner fitting. The invention described herein provides a single adjustable twist lock which is adapted to positively secure the corners of containers having either type of fitting. These same principles would be applicable to enable one to construct a twist lock to fit other nonstandard fittings, or to construct a twist lock which is adaptable to couple with more than two different corner configurations.

Having set forth the structure of the invention, its operation will now be discussed in detail. With the twist lock in the normal upper position shown in the drawing, the mechanism is adjusted to secure an ISO corner fitting. Handle 33 is prevented from rotating in a clockwise direction by front edge 60 of cap plate 16 and is prevented from rotating counterclockwise by the inner edge 63 of stop member 42 of hinge 37 which abuts spacer block 34. Just prior to coupling the container to the chassis, pivotable stop member 42 is lifted outward and upward so that it clears handle 33 which is then pivoted counterclockwise through a 90° arc to align twist lock head 15 with guide 43. In order to prevent misalignment of the twist lock while the container is being aligned with and placed on chassis 11, stop member 42 is then pivoted downward to its initial position so that outer edge 64 of stop member 42 abuts the side of gusset 35, while forward edge 65 of end cap 24 abuts spacer 34 of handle 33. Thus when the twist lock has been set to receive the corner fitting of the container, its orientation cannot be unintentionally disturbed before the container has been properly positioned for connection to the chassis. The twist lock head extends above guide 43 a sufficient distance to pass completely through hole 54 in an ISO fitting and into the main cavity 66 thereof. The container is then secured to the chassis by reversing the operation of handle 33, that is, hinge stop member 42 is pivoted upward, handle 33 is pivoted clockwise through a 90° arc, and stop member 42 is then allowed to return to its normal downward position. In this condition inner edge 63 of stop member 42 abuts spacer 34 of handle 33 to prevent counterclockwise rotation of the twist lock and further clockwise rotation of the handle is prevented by edge 60 of cap plate 16 which is adjacent gusset 35 and the edge of flat handle member 36.

Should the corner fitting of the container to be secured to the chassis be constructed in accordance with ASA standards, bottom wall 55 will be considerably thinner than the bottom wall of the corner fitting shown in the drawing, which is constructed in accordance with ISO standards. In such a case, tab 67 of spring clip 47 is pulled away from the handle of the yoke spacer and yoke spacer 46 is removed from its position between flange 22 and washer 32 by simply pulling outward. The twist lock is allowed to move longitudinally so that washer 32 is immediately adjacent flange 22 and the bottom of twist lock head 15 moves a like distance toward guide 43. This results in a space between flange 22 and washer 31 which, but for spacer 46, would permit longitudinal play of the twist lock. However, after the twist lock has moved to its alternate position, yoke spacer 46 is turned over so that spring 47 is upward instead of downward, and it is then reinserted between flange 22 and washer 31. When the spacer is being inserted, tab 67 of spring clip 47 rides up over spring catch 45 and when the spacer is fully inserted, notch 52 again engages spring catch 45 to secure the yoke spacer in place. The twist lock is then operated in the same manner as previously described to secure the chassis and container together. In order to readjust the twist lock for a corner fitting having a thicker bottom wall, the reverse operation is performed; that is, yoke spacer 46 is removed, the twist lock is raised, and the yoke spacer is again reinserted after turning it over so that it again is in the position as shown in the drawing. It should be noted that by making the thickness of guide 43 approximately equal to the bottom wall thickness of an ASA fitting, the guide properly performs its function to prevent lateral motion of the container while allowing longitudinal adjustment of the twist lock.

The adjustable twist lock constructed in accordance with the principles herein set forth operates easily and surely while having the necessary structural integrity required for its function. The adjustment for corner fittings having different configurations may be accomplished in a few seconds by even an inexperienced operator. Its strength and reliability recommend it to the transportation industry and especially the trucking branch thereof.

Having described in detail one embodiment of an adjustable twist lock, changes and modifications will likely occur to those skilled in the art. It would, for example, be a simple matter to change the shape and construction of the yoke spacer. However, it is not intended that the scope of this invention be restricted to the precise embodiment illustrated in the drawing and described in the specification, but it is rather intended that the invention be limited only by the appended claims.

I claim:

1. An adjustable twist lock for securing a container to a platform, said container having corner fittings on its lower corners, said twist lock comprising:
   a bolster secured to said platform;
   a locking member rotatably mounted in said bolster, said locking member being longitudinally movable in said bolster between a first operative position and a distinct second operative position; and
   spacer means adapted to removably engage said locking member and to selectively and positively maintain said locking member in each of said first and second operative positions;
   said locking member, when in said first operative position, being adapted to secure to said platform a container having corner fittings formed with bottom walls having a first thickness, and when in said second operative position, being adapted to secure to said platform a container having corner fittings formed with bottom walls having a second thickness.

2. The adjustable twist lock recited in claim 1, wherein:
   said locking member is formed with an elongated shank and an enlarged head;
   said bolster includes a flange having a hole therethrough, said locking member shank extending through said hole perpendicular to the plane of said flange;
   said locking member shank is formed with spaced first and second washers situated on either side of said flange, the space between said washers being substantially greater than the thickness of said flange, said washers thereby preventing said locking member from being removed from said bolster and restricting the longitudinal movement thereof in said hole.

3. The adjustable twist lock recited in claim 2 wherein:
   said spacer means is adapted to be removably inserted between said flange and said first washer to secure said locking member in said first position and between said flange and said second washer to secure said locking member in said second position.

4. The adjustable twist lock recited in claim 1, wherein:
   said locking member is formed with an elongated shank and an enlarged head;
   said bolster is a rectangular structure having first and second parallel flanges each having a hole therethrough, shaped to receive said shank, an end plate and a cap plate, said end plate and cap plate being parallel to each other and normal to said flanges, said holes in said first and second flanges being in axial alignment; and
   said elongated shank extends through both of said flanges.

5. The adjustable twist lock recited in claim 4, wherein:
   said elongated shank is formed with two spaced parallel washers situated on either side of said second flange to thereby restrict the longitudinal motion of said elongated shank in said bolster.

6. The adjustable twist lock as recited in claim 5, wherein:
   said spacer means is adapted to be removably inserted between either of said washers and said second flange to thereby maintain said locking member in either of said first and second positions.

7. The adjustable twist lock recited in claim 4, and further comprising:
   a handle secured to said locking member for rotational movement thereof; and
   stop means pivotably secured to said first flange, said stop means being adapted to selectively allow rotation of said locking member and prevent rotation of said locking member.

8. The adjustable twist lock recited in claim 7, wherein:
   said locking member is rotatable between locked and unlocked positions by means of said handle;
   accidental rotation of said locking member in said locked position is prevented by one edge of said end plate and one edge of said stop means abutting opposed sides of said handle; and
   accidental rotation of said locking member in said unlocked position is prevented by one edge of said cap plate and the other edge of said stop means abutting opposed sides of said handle.

9. The adjustable twist lock recited in claim 8, wherein:
   said second flange is formed with a spring catch; and
   said spacer means is formed with a spring clip adapted to engage said spring catch to thereby secure said spacer means to said bolster when in engagement with said elongated shank.

10. An adjustable twist lock, comprising:
    a platform adapted to receive a container having corner fittings on its lower corners;
    a locking member rotatably mounted on said platform, said locking member being longitudinally movable with respect to said platform between a first operative position and a distinct second operative position; and
    spacer means removably engaging said locking member and adapted to selectively and positively maintain said locking member in each of said first and second operative positions;
    said locking member being adapted, when in said first operative position, to secure to said platform a container having corner fittings formed with bottom walls of a first thickness, and further being adapted, when in said second operative position, to secure to said platform a container having corner fittings formed with bottom walls of a second thickness.

11. The adjustable twist lock recited in claim 10, wherein:
    said locking member is formed with an elongated shank and an enlarged head;
    said platform is formed with a flange having a hole therein; and
    said locking member shank is mounted in said hole, said shank being formed with spaced first and second washers situated on either side of said flange to thereby positively limit the longitudinal movement of said locking member between said first and second operative positions.

12. The adjustable twist lock recited in claim 11, wherein:
    said spacer means is adapted to be selectively removably inserted between either of said washers and said flange to thereby maintain said locking member in either of said first and second positions.